United States Patent Office 2,941,959
Patented June 21, 1960

2,941,959

ACTIVATION OF CLAY BY ACID TREATMENT, SAND AGING AND CALCINATION

Ernest W. Greene and Aldo P. Allegrini, Westfield, N.J., assignors to Minerals & Chemicals Corporation of America, Menlo Park, N.J., a corporation of Maryland No Drawing. Filed Feb. 21, 1956, Ser. No. 566,761

11 Claims. (Cl. 252—450)

This invention relates to an improved "dry" method of preparing adsorptive contact masses, especially useful as petroleum cracking catalysts, from naturally occurring clays, particularly koalin clays. Although the adsorptive contact masses prepared by our improved method have usefulness chiefly as catalysts in processes for cracking petroleum hydrocarbons to make gasoline, they are also useful as adsorbents for decolorizing vegetable and mineral oils and for other purposes.

The process of our invention comprises, basically, the steps of reacting the naturally occurring clay with sulfuric acid and then calcining the clay-acid reaction mixture to decompose certain portions thereof, as explained hereinafter, and thus produce the final product. This is a dry process, as opposed to the commonly used wet method of upgrading the adsorptive capacity of a clay in which the clay and acid are allowed to react and the soluble reaction products are then leached from the mass with water to leave behind an "activated" clay which, after drying and further treatment if necessary, is the final product.

In practicing the process of our invention, the clay and sulfuric acid are first mixed to form a plastic mass of homogeneous appearance which is thereafter formed into masses of the desired shape and size distribution. The shaped masses are then aged under such conditions as to insure substantially complete reaction of the type desired between the clay and the acid; and, lastly, the aged masses are calcined to convert them to the final product. The novelty of our new process resides in the particular manner in which the aforesaid aging operation is carried out therein, the process being an improvement on the process disclosed in a copending U.S. patent application of Serial Number 490,128 which was filed February 23, 1955, by Robinson et al.

It was pointed out in the above-identified copending application, that the clay-acid masses, when formed into the desired shape prior to aging, should preferably be protected from the surrounding atmosphere during aging, and it was suggested that the reason for this is to minimize changes in their moisture content since any such changes deleteriously affect the hardness of the final product; it was also pointed out in the copending application that aging should be carried out at temperatures between about 220° and about 325° F. for best results. The said copending application goes on to disclose aging in an enclosed, air-filled space, for a period of about 24 hours as a preferred way of carrying out their aging step; hereinafter this general method of aging will be referred to as restricted air aging.

Restricted air aging was discovered as a means of minimizing changes in the moisture content of pre-shaped clay-acid masses during aging which changes, as previously indicated, were thought to bring about substantial decreases in the hardness of the finished product. It has been experimentally shown that aging of pre-shaped clay-acid masses under the optimum conditions of time and temperature to give maximum reaction but without substantial isolation from the air outside the aging vessel to prevent moisture exchange therewith, such as aging in a conventional oven which is not sealed to prevent entry and exit of gases, results in the production of weak masses too soft for some commercial purposes.

The previously identified basic process of clay treatment into which our improved aging technique has been incorporated, and which we will hereinafter designate as the "dry process," converts clays to materials of enhanced catalytic and adsorptive properties which can be utilized as commercial adsorbents or petroleum cracking catalysts provided they are sufficiently hard for the purpose. Hardness is of prime importance in adsorptive contact masses because it enables them to withstand the rigors of service without excessive loss of material, as fines, through attrition.

Attrition tends to be particularly detrimental in the case of cracking catalysts since any fines produced therefrom, while they are in service, are carried out of the reactor by the effluent vapor stream and are thus immediately lost to the system.

The clay-acid reaction taking place during the aging step in the dry process is highly exothermic and it is rather difficult, and even impossible at times, to keep temperatures under control while aging the clay-acid masses in air (hereinafter broadly designated as air aging). As the reaction proceeds, it tends to increase in rate and the rate increase in turn causes general temperature rises and formation of "hot spots" within the system which make for even higher reaction rates with attendant higher temperatures and so on.

The process of the present invention is the outgrowth of our discovery of a novel and economical technique for aging the dry process clay-acid masses whereby aging times are greatly reduced from those required for air aging including restricted air aging, and wherein temperature conditions are much easier to control than is the case with air aging.

It is thus a principal object of the present invention to provide an improvement in the previously identified dry process for converting clays to adsorptive contact masses whereby aging times are greatly reduced from those required by the restricted air aging step.

It is another object of the invention to provide an improved aging step for the aforesaid dry process of clay conversion in which temperature control is greatly simplified by comparison with that which must be exercised when using the air aging method of said copending application.

Other objects and features of the invention will be readily apparent from the description thereof which follows.

Briefly, the aging technique which is the essence of our invention comprises surrounding the pre-shaped clay-acid masses with a free flowing granular material while they are aging. The granular material should be of such nature as to be substantially unreactive with sulfuric acid at aging temperatures and it should be of a different, preferably smaller particle size than the clay-acid masses so that it may subsequently be separated readily from the aged clay-acid masses such as by screening. The preferred granular material for our purpose is clean silica sand with negligible iron contamination. We have made the discovery that aging in a sand medium, as taught herein, at temperatures equivalent to those required for air aging can be accomplished in much shorter periods of time than are necessary in the air aging procedure. This advantage of aging in sand over the air aging of the previously mentioned copending application is unexpected, particularly in view of the teachings of the said copending application regarding restricted air aging. While it is true that submersion of the pre-shaped clay-acid masses in loose flowing silica sand, or its equivalent, prevents contact of the said masses with the surrounding air to a certain extent, it is equally true that the sand does not completely seal the masses from the air which infiltrates the aging chamber and circulates over and through the sand bed therein; consequently moisture exchange between surrounding air and pre-shaped clay-acid masses obviously takes place to a certain extent during aging of the latter in sand as taught herein. It would be expected that our sand aging would lead to excessively low hardness of final product, since moisture change is permitted aging, but such is not the case as will be demonstrated in examples to follow in illustration of the advantages of our invention. Aging in sand, or equivalent material, possesses a temperature control advantage over air aging by virtue of the fact that the sand, or equivalent, acts as a fairly effective "heat sink" serving to level off sharp increases in temperature within the system, caused by exothermic reaction, and to prevent buildup of localized hot spots therein.

Our new sand aging procedure can be accomplished in a conventional rotary drier or any other apparatus considered suitable for the purpose by those skilled in the art as, for example, a pug mill or a screw conveyor. In any event it is preferable that the sand or other granular material in which the pellets are aged be continually in motion, thus in effect producing a free-flowing mass of the granular material in which the pellets are mixed. The heat required to achieve and maintain the aging temperatures can be obtained from any well known source, such as burning fuel or heating coils, and the temperature control can be achieved by means familiar or obvious to those skilled in the art. The sand can be separated from the aged clay-acid masses easily by screening and it can then be circulated for reuse.

As previously noted, the process of the present invention is particularly intended for use on kaolin clays, by which is meant those naturally occurring clays containing kaolinite as the chief mineral constituent. The approximate chemical composition of kaolinite is represented by the formula: $Al_2O_3 2SiO_2 . 2H_2O$. The weight ratio of $SiO_2$ to $Al_2O_3$ indicated by this formula is 1.18 and kaolin clays generally possess $SiO_2/Al_2O_3$ ratios of from 1.0 to 1.5.

In the aforesaid copending patent application covering the dry process of clay conversion it was postulated that this process produces changes in the clay structure more or less along the following lines:

(1) The sulfuric acid reacts with aluminum and oxygen atoms in the clay during aging to form aluminum sulfate, hydrates of aluminum sulfate, and water.

(2) Upon calcination, the aluminum sulfate decomposes to yield aluminum oxide and oxides of sulfur, the latter passing off as vapor.

(3) Composition-wise, the final product is equivalent to the starting clay since the dry process treatment simply results in the removal of aluminum oxide from the kaolinite lattice during its reaction with acid and the redeposition of aluminum oxide within the lattice during subsequent calcination. With respect to catalytic properties, however, the final product is greatly superior to the original clay, leading to the conclusion that the dry process, in effect, brings about displacement of aluminum oxide within the clay structure to positions more conducive to catalytic utility of the product.

In putting the process of our invention into practice, the appropriate clay and sulfuric acid are first mixed to an appearance of homogeneity in any apparatus suitable for the purpose, as for example, a pug mill. In the preferred embodiment of the process, the clay-acid mixture is extruded to form pellets which are then aged in silica sand, or an equivalent granular material, as taught herein. Although extrusion is preferred as the means of forming the clay-acid mixture into masses of the desired size, other methods for accomplishing this which are well known to those in the art may be used instead. After the aging step, the granular material and extruded pellets, or other shaped masses, are separated and the latter calcined to obtain the final product.

While we prefer to use degritted raw clay (that which has been refined only to the extent that grit, foreign bodies and clots of undispersed clay have been eliminated) as a starting material in our process, we wish to have it clearly understood that the invention is not limited to the treatment of such a product. Clays which have received other preliminary treatments may still be amenable to processing in accordance with the process of our invention. Examples of preliminary treatments falling within this category are de-ironing by physical or chemical methods, conventional classifying operations, and even partial acid activation by the previously mentioned wet procedures. The volatile matter content (V.M.) of the starting clay should preferably not be so high as to make for too dilute a mixture of clay and acid for optimum handling under the conditions of the particular processing involved. We have obtained excellent results using a starting clay of about 14 percent V.M. with moderate dosages of concentrated sulfuric acid.

For our process, we prefer to use concentrated sulfuric acid, such as the commercially available 66° Bé. (about 93 percent $H_2SO_4$) grade, adding water to the mix, if necessary, to improve its workability. However, any strength acid consistent with proper plasticity of mix for the dosage employed can be used within the scope of our invention. We prefer to use acid dosages from about 60 percent to about 150 percent in our process, acid dosage being defined as the weight of 100 percent acid per weight of volatile free clay expressed on a percentage basis. By volatile free clay is meant that which has been heated to essentially constant weight at about 1700° F. Although acid dosages much lower than 60 percent, down to as low as 20 percent in fact, can be used in our process with some benefit, the clay conversion gradually falls off with decreasing dosage until ineffectual levels are reached. With the lower dosages of acid, it has been found necessary to have higher water-acid ratios in the mix than will suffice for more normal dosages, the principal reason for this being to adjust the said mixes to conditions of optimum plasticity for working. When a 20 percent dosage is employed, for example, good plasticity is attainable with a dilute acid of only 50 percent $H_2SO_4$ concentration. On the other hand, higher acid dosage, particularly on a clay of relatively coarse particle size, sometimes produces a mixture too thin for adequate workability. In this event, the situation can frequently be remedied by either grinding the clay prior to acid addition or by substituting fuming sulfuric acid for the more dilute acid conventionally used. Although our preferred range of acid dosage has been given as that from about 60 percent to about 150 percent, dosages higher than 150 percent can be used within the scope of our invention so long as a workable mix is obtainable in the process. Approximately 130 percent dosage represents the theoretical amount of acid that would be required for substantially complete reaction with an average kaolin clay.

When the clay-acid mixture is to be extruded to form the shaped masses for the aging step of our process, the V.M. of the mix should be between about 30 and about 65 percent with the preferred value being in the neighborhood of 50 to 55 percent.

For the sand aging step of our new process we prefer to use a rotary drier, the mixture of silica sand, or equivalent material, and clay-acid masses, in the desired weight ratio, being maintained in intimate contact therein for the necessary length of time and at the desired temperature level to accomplish proper aging. Silica sand, as stated previously, is the preferred aging medium in my process but granular materials which are equivalent thereto for the purpose may obviously be used within the scope of the invention. One such equivalent would be silica microspheres such as those used in certain paints to create light reflectance therein, paints of this type being those utilized for highway striping, for warning signs and for similar purposes. Numerous other inert granular materials, such as aluminum granules, would be suitable, as will be apparent to those skilled in the art. The preferred weight ratios of sand, or equivalent, to clay-acid masses for our new aging treatment are those from about 1 to 1 through about 5 to 1. The optimum range of aging temperatures for the present process corresponds to that of the dry process, i.e., from about 220° through about 325° F., but the aging can be accomplished in much shorter periods in our present method. The preferred range of aging times in our new sand aging step is that from about 1 to about 24 hours (with the optimum times running from about 2 to about 8 hours), whereas the workable range of aging times in the restricted air aging procedure has been disclosed to be that from about 6 to about 300 hours, with about 24 hours being considered optimum.

The calcining step of our process should be carried out preferably at a temperature and for a time to render the product substantially sulfate free. In most cases a temperature of from about 900° to about 1600° F., depending on the atmosphere in the calciner, and a time of between 1 and 24 hours is sufficient. While we do not wish to exclude all calcination temperatures outside of the range stated, we would like to make clear that at temperatures much below 900° F. the aluminum sulfate decomposition may be incomplete and that temperatures above 1600° F. may manifest themselves in lowered surface area of the final product. The value of the surface area of a catalyst usually gives an indication of its activity, i.e., the greater the surface area, the greater the acitvity.

The surface areas referred to herein are those determined by the method described in an article by Brunauer, Emmett and Teller appearing in J. Am. Chem. Soc. 60, 309–319 (1938), using a cross-sectional area of 15.4 A.² for the nitrogen molecule as suggested by H. K. Livingston in J. Colloid Sci. 4, 447–458 (1949).

It is within the scope of our invention to incorporate relatively small amounts of carbonaceous materials into the clay-acid mixtures of our process prior to the extrusion or shaping step, the presence of the carbon being advantageous in that it permits calcination at lower temperatures while at the same time adding to the quality of the final contact masses. Examples of suitable carbonaceous materials are wood flour, corn meal, tarry and asphaltic substances, and finely divided carbon, to name only a few.

Following are examples intended for purposes of illustration only which are not to be construed as limiting the invention to any particular embodiments disclosed therein.

*Example I*

This is an example included for the purpose of demonstrating the criticality of aging time, with respect to final catalyst hardness, when using restricted air aging in the dry process of the previously identified copending patent application.

The clay used in this example was a kaolin clay from Georgia of about 14 percent V.M. which had previously been refined to the extent that quartz material and water soluble salts had been substantially removed. This clay was thoroughly mixed with an 89 percent dosage of concentrated sulfuric acid and a 5 percent dosage of activated carbon; the mixture was extruded to form pellets $3/16$ inch in diameter and about $3/16$ inch long. Batches of the pellets were aged at about 220° F. in enclosed air-filled spaces for various lengths of time from 6 to 24 hours. After aging, the pellets were calcined at 1500° F. for 6 hours. The calcined catalyst pellets were evaluated as to hardness using a modification of the so-called Union hardness test for this evaluation. In the test for hardness, a sample of the pellets was screened through a 3-mesh sieve first and then a 5-mesh one, the $3/5$ fraction being used for the test and the oversize and undersize particles being discarded. Twenty-five grams of the $3/5$ pellets were placed in a steel cylinder along with eight steel balls of $5/8$ inch diameter. The cylinder containing the pellets and steel balls was rotated end-over end for 10 minutes at 18 r.p.m. and the contents then discharged onto an 8-mesh screen. The pellet fragments were separated into plus-8-mesh and minus-8-mesh fractions and the hardness calculated as indicated below:

$$\frac{\text{Wt. of plus-8-mesh}}{\text{Total wt. of both fractions}} \times 100 = \text{percent hardness}$$

Hardness values for the pellets of this example are tabulated below.

| Aging time | Hardness, percent |
|---|---|
| 6 hrs. | 14 |
| 15 hrs. | 18 |
| 18 hrs. | 35 |
| 24 hrs. | 92 |

The above table clearly shows an increase of hardness with increased aging time up to a period of 24 hours when an exceptionally good hardness was obtained. Although as previously disclosed herein, aging times in excess of 24 hours (up to about 300 hours) can be used in the restricted air aging procedure, the additional aging time contributes little or no additional hardness to the final catalyst and consequently 24 hours has come to be accepted as the optimum time for this method of aging.

Surface area measurements on pellets of this example produced results indicative of commercial suitability of the said pellets as cracking catalysts with no correlation between surface area and relative hardness being observed. All surface areas measured were found to be within the range from 120 to 130 m.²/gm.

*Example II*

This example typically illustrates the preparation of a cracking catalyst from kaolin clay by the dry process of the aforesaid copending patent application, using restricted air aging.

The kaolin clay of this example was a clay from Georgia which had been refined to eliminate sand and water soluble salts and which contained about 14 percent V.M. Its analysis by weight, on a total weight basis, was as follows:

| | Percent |
|---|---|
| $SiO_2$ | 44.20 |
| $Al_2O_3$ | 40.14 |
| $Fe_2O_3$ | Trace |
| CaO | 0.02 |
| MgO | 0.02 |
| $TiO_2$ | 0.40 |
| Alkali metal oxides | 0.5 |

An 89 percent dosage of concentrated sulfuric acid (about 93 percent $H_2SO_4$) and a 5 percent dosage of activated carbon were added to a sample of the above clay. The clay, acid and carbon were mixed to an appearance of homogeneity by pugging and the mixture was then extruded to form pellets $3/16$ inch in diameter and about $3/16$ inch long. The pellets were aged for about 35 hours at from 225° F. to 240° F. in an enclosed air-filled space and then calcined at 1500° F. until sulfate free. The final pellets were tested by various methods to evaluate their efficacy as a cracking catalyst and found to be suitable for this purpose.

In addition to actually testing the finished pellets as to cracking performance, they were also evaluated as to hardness using the aforesaid modification of the so-called Union hardness test for this evaluation.

The hardness of the pellets was determined to be 78 percent. This value is indicative of satisfactory hardness for a cracking catalyst.

Example III

This is a typical example of the use of my new process for the preparation of a cracking catalyst from kaolin clay.

The kaolin clay of this example was a clay from Georgia which had been refined to eliminate quartz material and other hard particles as well as water soluble salts. This clay was essentially identical to that of Example I in V.M., analysis and geographical origin.

Clay-acid pellets identical to those of Example II (same acid concentration and dosage, same amount of activated carbon, same pugging and extruding procedure) were prepared from the above-identified clay. The freshly made pellets were mixed with clean silica sand in the ratio at one part by weight of silica to one part by weight of pellets. The sand-pellet mixture was charged to a laboratory size externally gas-fired rotary drier and aged therein for 4 hours within the temperature range of 280° to 300° F. After being separated from the sand, the aged pellets were calcined at 1500° F., as in Example II, to convert them to the final catalyst product.

The hardness of the catalyst pellets was measured by the method used in Examples I and II (modified Union hardness test) and found to be 76 percent.

Comparison of the above hardness with that of the Example II dry process product shows substantially no difference in hardness between the cracking catalyst of Example II and that of the present example even though the latter was aged only 4 hours in sand whereas the former was aged for 35 hours by the restricted air aging method. Thus, even assuming that the Example II hardness could have been substantially equaled after 24 hours aging instead of the 35 hours actually used, our improved sand aging method has been demonstrated to have affected the same degree of hardness in a greatly reduced aging period.

We claim:

1. A method for the preparation of adsorptive contact masses from clay comprising the steps of: mixing the clay with sulfuric acid; aging the mixture in silica sand to permit reaction between the clay and the acid; separating the aged material from the silica sand; and, without leaching any of the water soluble components from the aged material, calcining the said material to eliminate sulfate therefrom.

2. A method for the preparation of adsorptive contact masses from kaolin clay comprising the steps of: mixing the clay with sulfuric acid; forming shaped masses from the mixture; aging the shaped masses in a silica sand to permit reaction between the kaolin and the acid; separating the aged masses from the silica sand; and, without leaching any of the water soluble components from the aged masses, calcining the said masses to eliminate sulfate therefrom.

3. A method for the preparation of adsorptive contact masses from kaolin clay comprising the steps of: mixing the clay with sulfuric acid and a small quantity of a suitable carbonaceous material; forming shaped masses from the mixture; aging the shaped masses in a silica sand to permit reaction between the kaolin and the acid; separating the aged masses from the silica sand; and without leaching any of the water soluble components from the aged masses, calcining the said masses to eliminate sulfate therefrom.

4. A method for the preparation of cracking catalyst masses from kaolin clay comprising the steps of: mixing the clay with a dosage of from 20 to 150 percent of sulfuric acid within the concentration range from 50 percent acid to fuming sulfuric acid; forming shaped masses from the mixture; aging the shaped masses by maintaining them within the temperature range of from about 220° to about 325° F. and intermixed with a silica sand for from 1 to 24 hours; separating the aged masses from the silica sand; and, without leaching any of the water soluble components from the aged masses calcining the said masses at from about 900° to about 1600° F. for a period of from about 1 to about 24 hours.

5. Adsorptive contact masses produced by the method of claim 1.

6. The method of claim 4 in which a small amount of a suitable carbonaceous material is mixed into the clay, along with the sulfuric acid.

7. The method of claim 4 in which the shaped masses are formed by means of extrusion.

8. The method of claim 4 in which water in addition to that in the acid is mixed into the clay along with the said acid to improve the workability of the mix.

9. Cracking catalyst masses produced by the method of claim 4.

10. A method for the preparation of cracking catalyst in a form of pellets from kaolin clay comprising the steps of: mixing the clay with a dosage of from about 60 to about 100 percent of about 66° Bé. sulfuric acid and a relatively small amount of finely divided activated carbon; extruding the mixture to form pellets; aging the pellets by maintaining them within the temperature range of from about 220° to about 325 F. and intermixed with freely flowing silica sand for from about 4 to about 8 hours; separating the aged pellets from the silica sand; and, without leaching any of the water soluble components from the aged pellets, calcining the said pellets at from about 1450° to about 1550° F. until they are substantially sulfate free.

11. The method of claim 10 in which the activated carbon is present in amount equal to about 5 percent of the weight of the volatile free clay.

References Cited in the file of this patent

UNITED STATES PATENTS

| | | |
|---|---|---|
| 1,739,796 | Mahler | Dec. 17, 1929 |
| 1,781,265 | Baylis | Nov. 11, 1930 |
| 1,792,625 | Baylis | Feb. 17, 1931 |
| 2,192,000 | Wilson | Feb. 27, 1940 |
| 2,485,626 | Mills | Oct. 25, 1949 |
| 2,665,259 | Buffet | Jan. 5, 1954 |
| 2,686,161 | Stewart | Aug. 10, 1954 |
| 2,727,868 | Simpson et al. | Dec. 20, 1955 |

FOREIGN PATENTS

| | | |
|---|---|---|
| 239,169 | Great Britain | July 6, 1926 |

UNITED STATES PATENT OFFICE

CERTIFICATE OF CORRECTION

Patent No. 2,941,959                          June 21, 1960

Ernest W. Greene et al.

It is hereby certified that error appears in the printed specification of the above numbered patent requiring correction and that the said Letters Patent should read as corrected below.

Column 3, line 14, after "permitted" insert -- during --; column 5, line 36, for "acitvity" read -- activity --.

Signed and sealed this 11th day of April 1961.

(SEAL)
Attest:

ERNEST W. SWIDER                      ARTHUR W. CROCKER
Attesting Officer                        Acting Commissioner of Patents